United States Patent
Chen et al.

(10) Patent No.: US 9,891,923 B2
(45) Date of Patent: Feb. 13, 2018

(54) LOOP PREDICTOR-DIRECTED LOOP BUFFER

(71) Applicant: VIA ALLIANCE SEMICONDUCTOR, LTD., Shanghai (CN)

(72) Inventors: Guo Hua Chen, Beijing (CN); Meng Chen Yang, Beijing (CN); Xin Yu Gao, Beijing (CN); Fan Gong Gong, Beijing (CN); Zhen Hua Huang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 406 days.

(21) Appl. No.: 14/534,841

(22) Filed: Nov. 6, 2014

(65) Prior Publication Data

US 2016/0092230 A1 Mar. 31, 2016

(30) Foreign Application Priority Data

Sep. 29, 2014 (CN) .......................... 2014 1 0512577

(51) Int. Cl.
- *G06F 9/30* (2006.01)
- *G06F 9/38* (2006.01)
- *G06F 12/0875* (2016.01)

(52) U.S. Cl.
CPC ........ *G06F 9/3806* (2013.01); *G06F 9/30065* (2013.01); *G06F 9/381* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 5,909,573 A | * | 6/1999 | Sheaffer | G06F 9/325 712/240 |
| 6,003,128 A | * | 12/1999 | Tran | G06F 9/3844 712/23 |

(Continued)

FOREIGN PATENT DOCUMENTS

| CN | 101101544 | 1/2008 |
|---|---|---|
| CN | 103593167 | 2/2014 |

(Continued)

OTHER PUBLICATIONS

Sherwood, Timothy et al. "Loop Termination Prediction" In Proceedings of the 3rd International Symposium on High Performance Computing (ISHPC2K). Oct. 2000 pp. 1-14. Downloaded on Jul. 25, 2014 from http://cseweb.ucsd.edu/-calder/papers/ISCPC2K-LOOP.pdf.

(Continued)

*Primary Examiner* — William B Partridge
(74) *Attorney, Agent, or Firm* — McClure, Qualey & Rodack, LLP

(57) ABSTRACT

A loop predictor trains a branch instruction to determine a trained loop count of a loop. When the loop fits in an instruction buffer, the processor stops fetching from an instruction cache, sends the loop instructions to an execution engine from the buffer without fetching from the cache, maintains a loop pop count of times the branch is sent to the execution engine from the buffer, and predicts the branch instruction is taken when the loop pop count is less than the trained loop count and otherwise predicts not taken.

20 Claims, 7 Drawing Sheets

(56) References Cited

U.S. PATENT DOCUMENTS

| | | | |
|---|---|---|---|
| 6,263,428 B1* | 7/2001 | Nonomura | G06F 9/3844 |
| | | | 712/239 |
| 7,010,676 B2* | 3/2006 | Busaba | G06F 9/3844 |
| | | | 712/239 |
| 2002/0083310 A1* | 6/2002 | Morris | G06F 9/325 |
| | | | 712/233 |
| 2004/0123075 A1* | 6/2004 | Almog | G06F 9/3844 |
| | | | 712/207 |
| 2008/0005534 A1* | 1/2008 | Jourdan | G06F 9/3802 |
| | | | 712/206 |

FOREIGN PATENT DOCUMENTS

| | | |
|---|---|---|
| EP | 0992894 | 4/2000 |
| EP | 1050804 | 11/2000 |
| FR | 2693572 | 1/1994 |

OTHER PUBLICATIONS

Gochman, Simcha et al. "The Intel® Pentium® M Processor: Microarchitecture and Performance" *Intel Technology Journal* vol. 7, Issue 2, May 21, 2003 pp. 21-36. Downloaded on Jul. 25, 2014 from http://www.weblearn.hs-bremen.de/risse/RST/WS04/Centrino/vol7iss2_art03.pdf.

Seznec, André "The L-TAGE Branch Predictor" *Journal of Instruction-Level Parallelism* May 9, 2007. pp. 1-13 Downloaded on Jul. 25, 2014 from http://www.jilp.org/vol9/v9paper6.pdf.

Kanter, David "Inside Nehalem: Intel's Future Processor and System" Apr. 2, 2008. pp. 1-2, Downloaded on Jul. 25, 2014 from http://www.realworldtech.com/nehalem/5/.

* cited by examiner

LOOP PREDICTOR-DIRECTED LOOP BUFFER

CROSS REFERENCE TO RELATED APPLICATION(S)

This application claims priority to China Application No. 201410512577, filed Sep. 29, 2014, which is hereby incorporated by reference in its entirety.

BACKGROUND

Computer programs commonly contain loops. A loop is a sequence of instructions, commonly referred to as the loop body, which is executed repeatedly until a condition occurs that causes the loop to exit and proceed to the next instruction following the loop. At the machine language level, typically the loop ends with a conditional branch instruction that normally branches back to the instruction at the beginning of the loop body, but which is not taken and falls through to the next sequential instruction when the condition occurs. The condition may be, for example, that a variable, which was initialized to a positive value and then decremented each time through the loop, reaches zero.

Loops present a potential performance problem for modern processors because they include a conditional branch instruction, particularly for pipelined and/or superscalar processors. Generally speaking, in order to fetch and decode instructions fast enough to provide them to the functional units of the processor that execute the instructions, the fetch unit must predict the presence of conditional branch instructions in the instruction stream and predict their outcome, i.e., whether they will be taken or not taken and their target address. If a conditional branch instruction is mispredicted, the misprediction must be corrected, which results in a period in which the execution functional units are starved for instructions to execute, often referred to as a pipeline bubble, while the front end of the pipeline begins to fetch and decode instructions at the corrected address. Additionally, the decoding of the fetched instructions prior to issuance for execution may be complex, particularly for some instruction set architectures, and consequently introduce latency that may also cause pipeline bubbles.

Another concern in modern processors is power consumption. This is true in many environments. For example, in battery-powered environments such as mobile phones or notebook computers or tablets, there is a constant desire to reduce processor power consumption in order to extend the time between required battery recharging. For another example, in server environments, the presence of a relatively large—indeed sometimes enormous—number of servers results in a very significant cost in terms of power consumption, in addition to environmental concerns. As discussed above, the decoding of instructions, including loop body instructions, may be complex and require a considerable amount of power to be consumed by the decode logic, in addition to the power consumed by the fetch logic and instruction cache from which the instructions are fetched and the branch predictors that predict the fetched conditional branch instructions of loops.

Thus, it is desirable to provide a means for a processor to increase performance and/or reduce power consumption when executing loops.

BRIEF SUMMARY

In one aspect the present invention provides a processor. The processor includes an instruction cache, an execution engine, an instruction buffer and a loop predictor. The loop predictor trains a branch instruction to determine a trained loop count of a loop. The loop comprises a sequence of instructions beginning with a target of the branch instruction and ending with the branch instruction. The loop predictor also determines whether a size of the loop is not greater than a size of the instruction buffer. When the size of the loop is not greater than the size of the instruction buffer, the processor stops fetching from the instruction cache, sends the loop instructions to the execution engine from the instruction buffer without fetching them from the instruction cache, maintains a loop pop count that indicates a number of times the branch instruction is sent to the execution engine from the instruction buffer without being fetched from the instruction cache, and predicts the branch instruction is taken when the loop pop count is less than the trained loop count and otherwise predicts the branch instruction is not taken. Additionally, during the second execution instance of the loop, when the size of the loop is greater than the size of the instruction buffer, the processor: fetches the loop instructions from the instruction cache, decodes them and sends them to the execution engine, maintains a loop fetch count that indicates a number of times the branch instruction is fetched from the instruction cache, and predicts the branch instruction is taken when the loop fetch count is less than the trained loop count and otherwise predicts the branch instruction is not taken.

In another aspect, the present invention provides a method performed by a processor having an instruction cache, an instruction buffer, and an execution engine. The method includes training a branch instruction to determine a trained loop count of a loop. The loop comprises a sequence of instructions beginning with a target of the branch instruction and ending with the branch instruction. The method also includes determining whether a size of the loop is not greater than a size of the instruction buffer. The method also includes, when the size of the loop is not greater than the size of the instruction buffer: stopping fetching from the instruction cache, sending the loop instructions to the execution engine from the instruction buffer without fetching them from the instruction cache, maintaining a loop pop count that indicates a number of times the branch instruction is sent to the execution engine from the instruction buffer without being fetched from the instruction cache, and predicting the branch instruction is taken when the loop pop count is less than the trained loop count and otherwise predicting the branch instruction is not taken. Additionally, the method includes during the second execution instance of the loop, when the size of the loop is greater than the size of the instruction buffer: fetching the loop instructions from the instruction cache, decoding them and sending them to the execution engine, maintaining a loop fetch count that indicates a number of times the branch instruction is fetched from the instruction cache, and predicting the branch instruction is taken when the loop fetch count is less than the trained loop count and otherwise predicting the branch instruction is not taken.

In yet another aspect, the present invention provides a computer program product encoded in at least one non-transitory computer usable medium for use with a computing device, the computer program product comprising computer usable program code embodied in said medium for specifying a processor. The computer usable program code includes first program code for specifying an instruction cache, second program code for specifying an execution engine, third program code for specifying an instruction buffer, and fourth program code for specifying a loop predictor. The loop predictor trains a branch instruction to determine a trained loop count of a loop. The loop comprises a sequence of instructions beginning with a target of the branch instruction and ending with the branch instruction. The loop predictor also determines whether a size of the loop is not greater than a size of the instruction buffer. When the size of the loop is not greater than the size of the instruction buffer, the processor: stops fetching from the instruction cache, sends the loop instructions to the execution engine from the instruction buffer without fetching them from the instruction cache, maintains a loop pop count that indicates a number of times the branch instruction is sent to the execution engine from the instruction buffer without being fetched from the instruction cache, and predicts the branch instruction is taken when the loop pop count is less than the trained loop count and otherwise predicts the branch instruction is not taken. Additionally, during the second execution instance of the loop, when the size of the loop is greater than the size of the instruction buffer, the processor: fetches the loop instructions from the instruction cache, decodes them and sends them to the execution engine, maintains a loop fetch count that indicates a number of times the branch instruction is fetched from the instruction cache, and predicts the branch instruction is taken when the loop fetch count is less than the trained loop count and otherwise predicts the branch instruction is not taken.

DETAILED DESCRIPTION OF THE EMBODIMENTS

Figure 1:
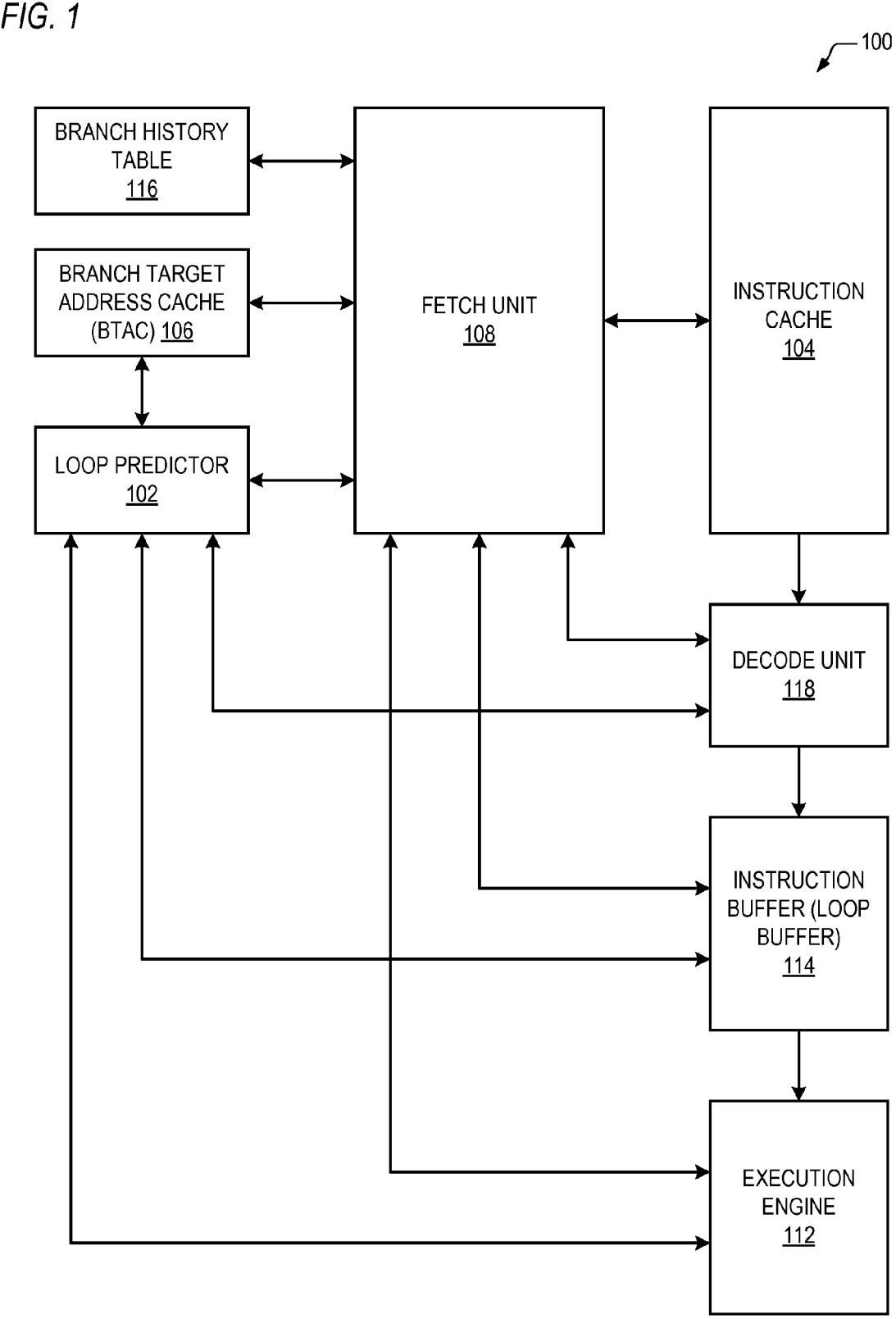
FIG. 1 is a block diagram illustrating a processor.

Referring now to FIG. 1, a block diagram illustrating a processor 100 is shown. The processor 100 includes a fetch unit 108 that controls fetching of instructions from an instruction cache 104 that are provided to an instruction decode unit 118. The decode unit 118 provides decoded instructions to an instruction buffer 114, also referred to herein as a loop buffer 114, which provides instructions to an execution engine 112 for execution. The fetch unit 108 is coupled to the decode unit 118, instruction buffer 114, and execution engine 112. The processor 100 also includes a plurality of branch predictors. In one embodiment, the branch predictors include a branch history table 116, a branch target address cache (BTAC) 106 and a loop predictor 102, each of which is coupled to the fetch unit 108. The loop predictor 102 is also coupled to the decode unit 118, instruction buffer 114 and execution engine 112.

For purposes of the present disclosure, a loop is a sequence of instructions that ends with a backward-branching conditional branch instruction and that begins with a target instruction of the conditional branch instruction, i.e., the instruction to which the conditional branch instruction branches. The conditional branch instruction may be referred to as a loop branch instruction. An iteration of a loop refers to a single execution of all the instructions of the loop. An execution instance of a loop refers to the set of iterations of the loop that are executed until the loop exits due to a not taken direction of its loop branch instruction. As described herein, the loop predictor 102 is advantageously used to predict the exit of a loop and thereby avoid a branch misprediction and its concomitant performance penalty. Advantageously, the loop predictor 102 can be used to predict the exit of a loop in each of two modes. In the first mode, the loop is too large to fit in the loop buffer 114, so the loop instructions are repeatedly fetched from the instruction cache 104 and decoded by the decode unit 118 before being provided to the execution engine 112. Each time the loop branch instruction is fetched from the instruction cache 104, the loop predictor 102 makes a prediction about whether it will be taken or not taken. The loop predictor 102 keeps track of the number of times the loop branch instruction has been taken during the current execution instance of the loop and also knows the number of times it was taken during the last execution instance of the loop and uses this information to make the predictions. In the second mode, referred to as loop buffer mode, the already-decoded instructions of the loop fit entirely in the loop buffer 114 and are popped from the loop buffer 114 for provision to the execution engine 112 without needing to be repeatedly fetched from the instruction cache 104 and decoded by the decode unit 118. In loop buffer mode, the loop predictor 102 instructs the loop buffer to exit the loop after the loop branch instruction has been popped from the loop buffer 114 the number of times it was taken during the last execution instance of the loop.

The fetch unit 108 provides an instruction pointer, or program counter, value to the instruction cache 104 to access the instruction cache 104. In response, the instruction cache 104 provides a block of instruction bytes to the decode unit 118. In one embodiment, the block is sixteen bytes per clock cycle. Generally, the fetch unit 108 fetches the next sequential block of instructions; however, in the case of a branch instruction, the fetch unit 108 fetches a block of instructions at the target address of the branch instruction. The fetch unit 108 may fetch at a branch target address provided as a prediction by one of the branch predictors 102/106/116, or at a branch target address provided by the execution engine 112, such as to correct a branch misprediction.

The branch history table 116 stores a taken/not taken (T/NT) prediction, also referred to as a branch direction or direction, for previously executed branch instructions. In one embodiment, the branch history table 116 is indexed by a value that is the Boolean exclusive-OR of the instruction cache 104 fetch address of a branch instruction and a branch history pattern that is includes a bit for each of the last N executed branch instructions, where N is a predetermined value, and each bit indicates whether the branch instruction was taken or not taken. In one embodiment, the branch history table 116 includes saturating counters corresponding to a plurality of branch instructions, and each of the saturating counters counts up when a branch is taken and count down when the branch is not taken, and the T/NT prediction is based on the value of the counter.

The loop predictor 102 stores a trained loop count for previously executed loop branch instructions, which may be used to make a T/NT prediction of a conditional branch instruction previously identified as a loop branch instruction.

A loop branch instruction is a conditional branch instruction that branches backward in the instruction stream. Thus, the loop branch instruction appears in program order at the end of the loop. For example, the conditional branch instruction may be a relative jump instruction that includes a signed offset that is added to the instruction pointer value of the conditional branch instruction to compute the branch target address. Preferably, additionally, in order to qualify as a loop branch instruction, the conditional branch instruction was taken a threshold number of times in the most recent execution instance of the loop. The trained loop count indicates the number of times the loop branch instruction was taken during the last execution instance of the loop, which may be a useful indication of the number of times the loop branch instruction will be taken in the next execution instance of the loop. For example, if the trained loop count is 37, then the loop predictor 102 can predict the loop branch instruction will be taken the first 37 times it is fetched from the instruction cache 104, and the loop predictor 102 can predict the loop branch instruction will be not taken the $38^{th}$ time it is fetched, i.e., the loop predictor 102 can predict the loop will exit.

Advantageously, the loop predictor 102 can also be used in a loop buffer mode of the processor 100. In loop buffer mode, the processor 100 detects that it is executing a loop that is entirely present in the loop buffer 114. Consequently, the processor 100 stops fetching from the instruction cache 104. Instead, the processor 100 pops the already decoded loop instructions from the loop buffer 114 for provision to the to execution engine 112. Advantageously, the loop predictor 102 can predict when a loop branch instruction that is being popped out of the loop buffer 114 will be taken or not taken similar to the manner in which the loop predictor 102 predicts the direction of a loop branch instruction fetched from the instruction cache 104, i.e., when the processor 100 is not operating in loop buffer mode, typically because the loop is too large to fit in the loop buffer 114. Advantageously, the loop predictor 102 can be used to predict the direction of loop branch instructions when the processor 100 is operating in either mode. The loop predictor 102 is described in more detail below with respect to FIG. 2, and its operation is described below in more detail with respect to the remaining Figures.

The BTAC 106 stores a direction prediction and a branch target address for previously executed branch instructions and provides the direction prediction and branch target address selected by the instruction cache 104 fetch address of a branch instruction. The BTAC 106 also stores other information related to each of the branch instructions. For example, the other information may include the type of the branch instruction, such as whether the instruction is a call instruction, a return instruction, an indirect branch instruction, a conditional relative branch instruction, an unconditional relative branch instruction or a loop branch instruction, as described herein. Advantageously, in one embodiment, the additional information also includes a trained loop branch flag (referred to in FIG. 2 as trained loop branch flag 278) that indicates whether or not the conditional branch instruction is a trained loop branch instruction. In one embodiment, the conditional branch instruction has its trained loop branch flag 278 set only if it has a valid trained loop count 206 in the trained loop count table 201 of FIG. 2, as described in more detail below. In one embodiment, the branch history table 116 is indexed by a value that is the fetch address of the instruction cache 104. In one embodiment, the processor 100 includes other branch predictors, such as a stack-based call/return predictor. Preferably, the BTAC 106 provides an indication of whether the prediction from the branch history table 116, the loop predictor 102 (e.g., via a set value of the trained loop branch flag 278) or the BTAC 106 itself should be used to predict the branch instruction.

The decode unit 118 decodes the instructions fetched from the instruction cache 104. The decoding may involve breaking the stream of undifferentiated instruction bytes received from the instruction cache 104 into distinct instructions according to the instruction set architecture (ISA) of the processor 100. This is also referred to as instruction formatting. For example, in one embodiment the processor 100 is an x86 ISA processor. Instructions in the x86 ISA are variable length and may begin at any byte boundary in memory. Consequently, an x86 instruction may span multiple blocks fetched from the instruction cache 104. Presently, x86 ISA instructions may be between one and fifteen bytes long. For another example, in one embodiment the processor 100 is an Advanced RISC Machines (ARM) ISA processor. Instructions in certain modes of an ARM ISA processor may also be variable length. For example, in some modes an ARM ISA instruction may be either sixteen bits long or 32 bits long. Embodiments with other ISAs are contemplated, which may or may not include variable length instructions.

Typically, decoding/formatting the variable length instructions requires a significant amount of logic, which may require a substantial amount of power and may involve latency in the provision of decoded/formatted instructions to the execution engine 112. More specifically, depending upon the instruction mix, it may be difficult for the decode unit 118 to provide decoded instructions to the instruction buffer 114 fast enough to maintain high utilization of the execution engine 112. Advantageously, when operating in loop buffer mode, the loop buffer 114 may be able to provide the loop instructions to the execution engine 112 at a sufficient rate to fully utilize the execution engine 112, particularly with the additional advantage of predicting the direction of the loop branch instruction by the loop predictor 102, as described herein, to avoid a misprediction when the loop exit occurs, thereby potentially improving the performance of the processor 100. Additionally, and advantageously, when operating in loop buffer mode, a significant amount of power may be saved because the instruction cache 104, fetch unit 108, branch history table 116, and/or decode unit 118 may be temporarily turned off during a substantial portion of operation in loop buffer mode. In one embodiment, a buffer (not shown) is present between the instruction cache 104 and the decode unit 118 for buffering blocks of instruction bytes; this buffer may also be turned off when operating in loop buffer mode.

Conventionally, operating in loop buffer mode has involved effectively always predicting the loop branch instruction will be taken, which implies that upon loop exit, i.e., the last time the loop branch instruction is executed, a misprediction will occur that will have to be corrected by the processor 100. Advantageously, embodiments are described herein in which the loop predictor 102 operates in conjunction with the loop buffer 114 in loop buffer mode to potentially accurately predict the loop exit and thereby avoid the misprediction experienced by a conventional processor 100 not having the benefit of the loop predictor-directed loop buffer mode operation.

The decoding may also involve decoding the instruction bytes to generate additional microarchitectural control bits that become part of the instructions as they flow down the processor 100 pipeline. For example, the additional control bits may be used by the execution engine 112 to reduce the amount of decoding required by the execution engine 112, thereby improving performance and/or power consumption. Regardless of the ISA and/or microarchitecture, the processor 100 may benefit from loop predictor-based loop buffer operation as described herein.

The instruction buffer 114, or loop buffer 114, receives decoded instructions from the decode unit 118 and provides them to the execution engine 112 as requested thereby. Preferably, the instruction buffer 114 comprises a circular queue of entries into which the decoded instructions are pushed by the decode unit 118 and from which they are popped by the execution engine 112. A push pointer is maintained that points to the next entry into which an instruction is pushed and a pop pointer is maintained that points to the next entry from which an instruction is popped. The pointer values are used to determine which entries are valid and are also used to determine when the instruction buffer 114 is full and when it is empty. In one embodiment, the size, or length, of the loop buffer 114 is 24 entries, i.e., the loop buffer 114 is capable of holding 24 decoded instructions. In such an embodiment, a loop that is 24 instructions or shorter will fit entirely in the loop buffer 114. Other embodiments are contemplated in which the size of the loop buffer 114 is larger or smaller than 24.

The instruction buffer 114 also includes control logic that controls its operation as described herein, such as the updating of the pointers, in cooperation with the loop predictor 102. As described herein, when the processor 100 determines that it has encountered a loop that fits entirely in the loop buffer 114 ("fits entirely" means the size of the loop is not greater than the size of the loop buffer 114) and enters loop buffer mode, fetching from the instruction cache 104 is paused, which advantageously prevents the loop instructions in the loop buffer 114 from being overwritten. The control logic readjusts the pointers when entering loop buffer mode. Specifically, the pop pointer is updated to point to the target of the loop branch instruction. When the loop predictor 102 effectively predicts the loop branch instruction will be taken at the end of a loop iteration, the control logic updates the pop pointer to the target of the loop branch instruction.

The execution engine 112 executes the formatted instructions received from the instruction buffer 114. In one embodiment, the instruction buffer 114 is capable of providing up to three instructions per clock cycle to the execution engine 112. The execution engine 112 includes execution units that execute instructions to produce results according to the ISA of the processor 100. In one embodiment, the execution engine 112 comprises a superscalar out-of-order execution microarchitecture. However, embodiments with other microarchitectures are contemplated. In one embodiment, the execution engine 112 also includes an instruction translator (not show) that translates each of the formatted ISA instructions into one or more microinstructions that are executed by the execution units. In one embodiment, the processor 100 includes a microinstruction buffer into which the instruction translator writes microinstructions waiting to be issued to the execution units. An embodiment is contemplated in which the microinstruction buffer functions as a loop buffer rather than, or in addition to, the instruction buffer 114. The execution engine 112 may also include architectural state, such as an architectural register set, to which the instruction results are written. The execution engine 112 may also include a memory subsystem, such as a cache memory hierarchy and memory order buffer, to/from which data operands are written/read.

Figure 2:
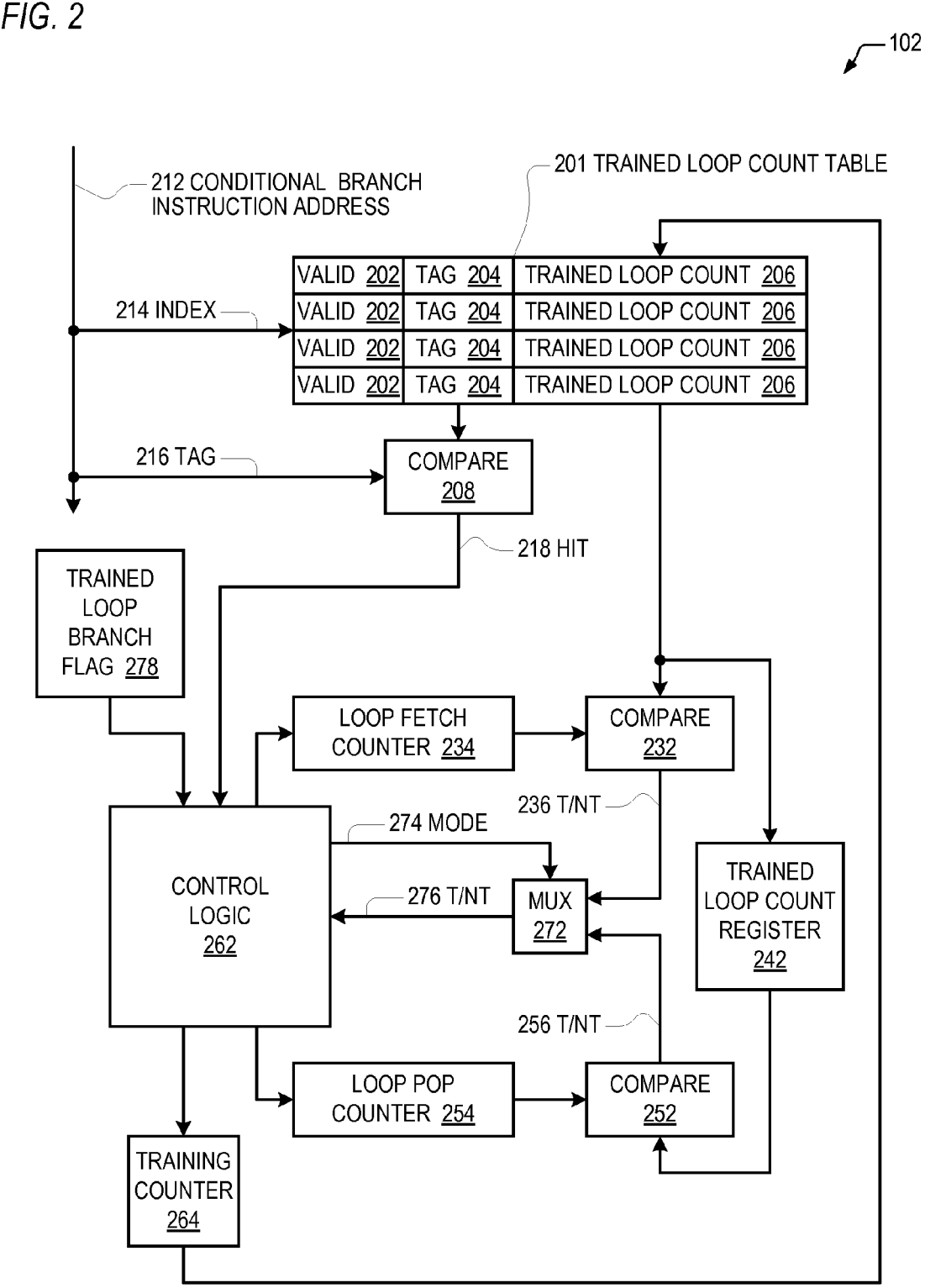
FIG. 2 is a block diagram illustrating the loop predictor of FIG. 1.

Referring now to FIG. 2, a block diagram illustrating the loop predictor 102 of FIG. 1 in more detail is shown. The loop predictor 102 includes a trained loop count table 201, a loop fetch counter 234, a loop pop counter 254, a trained loop count register 242 and a training counter 264. Also shown in FIG. 2 is a trained loop branch flag 278. The trained loop branch flag 278 is representative of a plurality of trained loop branch flags 278. The trained loop branch flags 278 are preferably stored in entries of the BTAC 106 associated with respective branch instructions and are provided to control logic 262 of the loop predictor 102 in response to BTAC 106 accesses with a fetch address of an instruction cache 104 block that includes the respective branch instructions. The control logic 262 clears and/or increments the loop fetch counter 234, loop pop counter 254 and training counter 264 as needed, as described herein. Preferably, the control logic 262 comprises combinatorial and sequential logic, which may include a state machine.

The trained loop count table 201 includes a plurality of entries, each including a valid bit 202, a tag 204 and a trained loop count 206. The trained loop count 206 of a given entry is updated with the value of the training counter 264 as needed, as described below with respect to FIG. 3. The trained loop count table 201 is indexed by an index 214 portion of a conditional branch instruction address 212. Typically, when the trained loop count table 201 is being read, the branch instruction address 212 is the instruction pointer used to access the instruction cache 104 and BTAC 106, for example, as at block 503 of FIG. 5, which is described below. Typically, when the trained loop count table 201 is being written, the branch instruction address 212 is the address of the branch instruction in use, for example, as at block 312 of FIG. 3 or block 404 of FIG. 4, which are described below. In some embodiments, the trained loop count table 201 may be direct-mapped or set-associative. A tag 216 portion of the conditional branch instruction address 212 is compared by a first comparator 208 with the tag 204 of the selected entry to generate a hit signal 218 that is provided to the control logic 262. The selected trained loop count 206 is compared by a second comparator 232 with the loop fetch counter 234 to generate a first taken/not taken (T/NT) indicator 236 that is provided to one input of a 2-input mux 272. The selected trained loop count 206 is also provided to a trained loop count register 242 that stores a piped-down version of the trained loop count 206 for use while the processor 100 is in a loop buffer mode. In one embodiment, the trained loop count register 242 comprises a plurality of registers 242 for storing a plurality of trained loop counts 206. The piped-down version of the trained loop count 206 stored in the trained loop count register 242 is compared by a third comparator 252 with the loop pop counter 254 to generate a second T/NT indicator 256 that is provided to the other input of the 2-input mux 272. A mode indicator 274 generated by the control logic 262 controls the mux 272 to select one of the inputs for provision on its output as a third T/NT indicator 276 that is provided to the control logic 262. When the processor 100 is in a loop buffer mode, described in more detail below, the control logic 262 generates a value on the mode indicator 274 to cause the mux 272 to select the output of the third comparator 252 and otherwise generates a value on the mode indicator 274 to cause the mux 272 to select the output of the second comparator 232. Operation of the loop predictor 102 is described in more detail below with respect to the remaining Figures.

Figure 3:
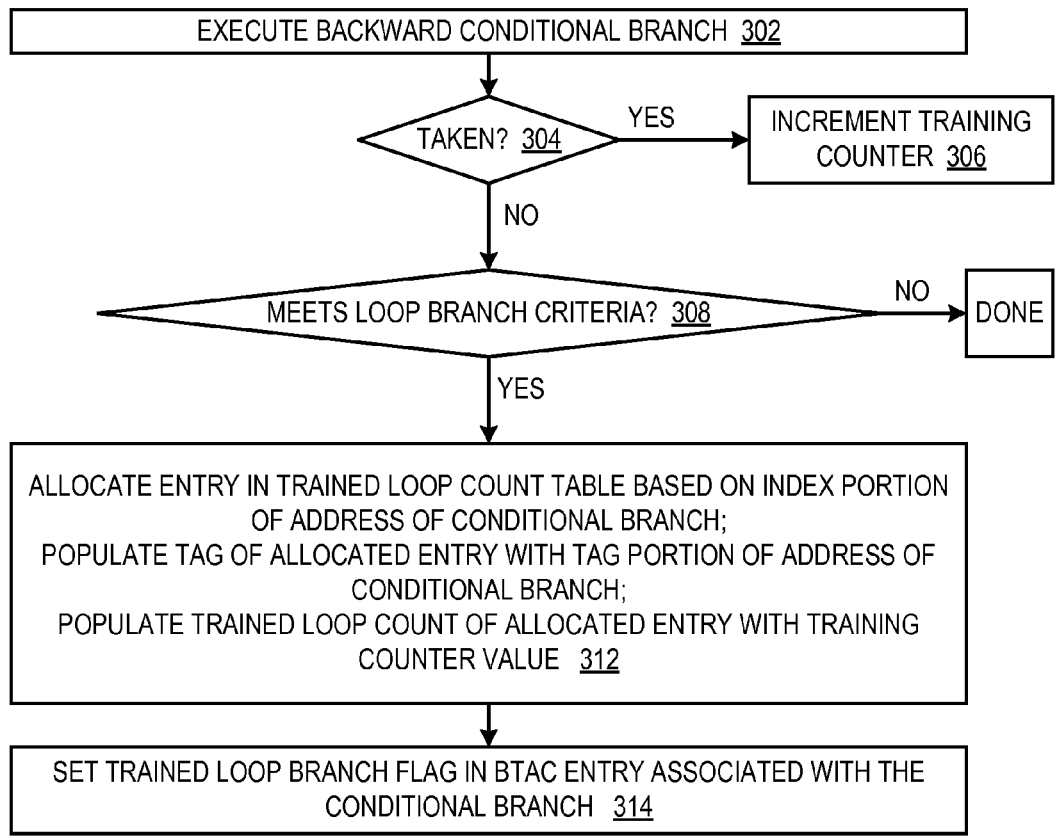
FIG. 3 is a flowchart illustrating operation of the processor of FIG. 1.

Referring now to FIG. 3, a flowchart illustrating operation of the processor 100 of FIG. 1 is shown. Flow begins at block 302.

At block 302, the execution engine 112 executes a conditional branch instruction that branches backward. That is, the execution engine 112 determines the correct direction and the correct target address of the branch instruction. Preferably, if the branch instruction was mispredicted, i.e., the correct direction and target address do not match the predicted direction and target address, the execution engine 112 corrects for the misprediction. More specifically, the execution engine 112 causes the front end of the processor 100 to be flushed and causes the fetch unit 108 to begin fetching at the correct target address. Additionally, the execution engine 112 notifies the loop predictor 102 about the execution of the branch instruction. Flow proceeds to decision block 304.

At decision block 304, the loop predictor 102 determines from the execution engine 112 whether the correct direction of the branch instruction was taken or not taken. If taken, flow proceeds to block 306; otherwise, flow proceeds to decision block 308.

At block 306, the loop predictor 102 increments the training counter 264. Flow ends at block 306.

At decision block 308, the loop predictor 102 determines whether the branch instruction meets the criteria for a loop branch. Preferably, the branch instruction meets the loop branch criteria if it is branches backwards, the trained loop count table 201 does not already include an entry for the branch instruction and the training counter 264 value is sufficiently large. For example, in one embodiment, the training counter value 264 must be at least a value of 24. In one embodiment, in order to meet the loop branch criteria, the loop predictor 102 must also determine that the same training counter 264 value was determined for at least N consecutive instances of the loop. In one embodiment, N is three, for example. In another embodiment, N is seven, for example. If the branch instruction meet the criteria, flow proceeds to block 312; otherwise, flow ends.

At block 312, the loop predictor 102 allocates an entry in the trained loop count table 201. Preferably, the loop predictor 102 allocates the entry based on the index portion 214 of the branch instruction address 212. Preferably, allocating the entry includes setting the valid bit 202 of the entry. The loop predictor 102 also populates the tag field 204 of the allocated entry with the tag portion of the branch instruction address 212 and populates the trained loop count field 206 of the allocated entry with the training counter 264 value. Flow proceeds to block 314.

At block 314, the loop predictor 102 causes the trained loop branch flag 278 in the entry of the BTAC 106 associated with the branch instruction to be set. Flow ends at block 314.

Figure 4:
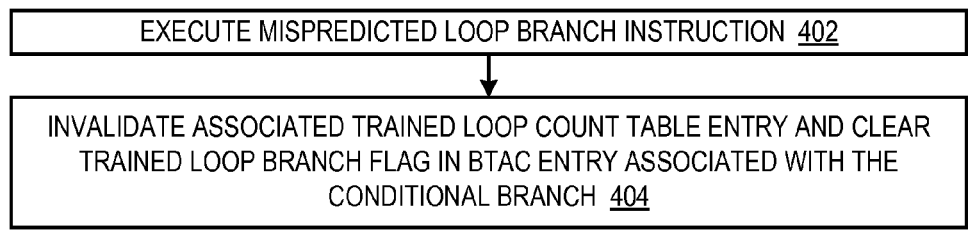
FIG. 4 is a flowchart illustrating operation of the processor of FIG. 1.

Referring now to FIG. 4, a flowchart further illustrating operation of the processor 100 of FIG. 1 is shown. Flow begins at block 402.

At block 402, the execution engine 112 executes a mispredicted loop branch instruction and notifies the loop predictor 102. Preferably, the execution engine 112 knows the conditional branch instruction is a loop branch instruction because the trained loop branch flag 278 that was provided by the BTAC 106 is piped down to the execution engine 112. Flow proceeds to block 404.

At block 404, the loop predictor 102 invalidates the entry in the trained loop count table 201 associated with the mispredicted loop branch instruction. Additionally, the loop predictor 102 causes the trained loop branch flag 278 in the entry of the BTAC 106 associated with the loop branch instruction to be cleared. The loop branch instruction may be trained again in a subsequent execution instance of its loop. Flow ends at block 404.

Figure 5A:
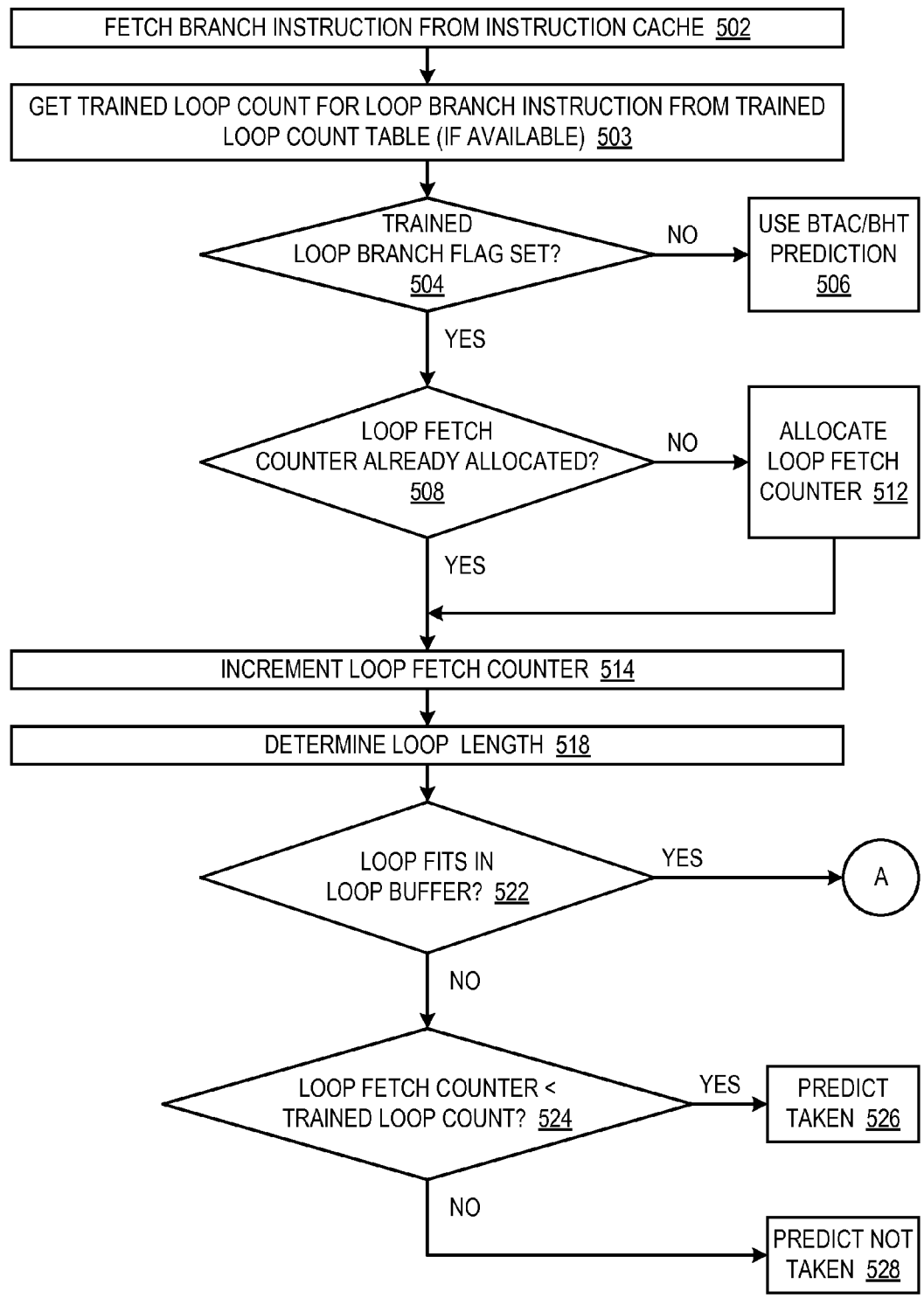
FIGS. 5A and 5B, referred to collectively as FIG. 5, is a flowchart illustrating operation of the processor of FIG. 1.
Figure 5B:
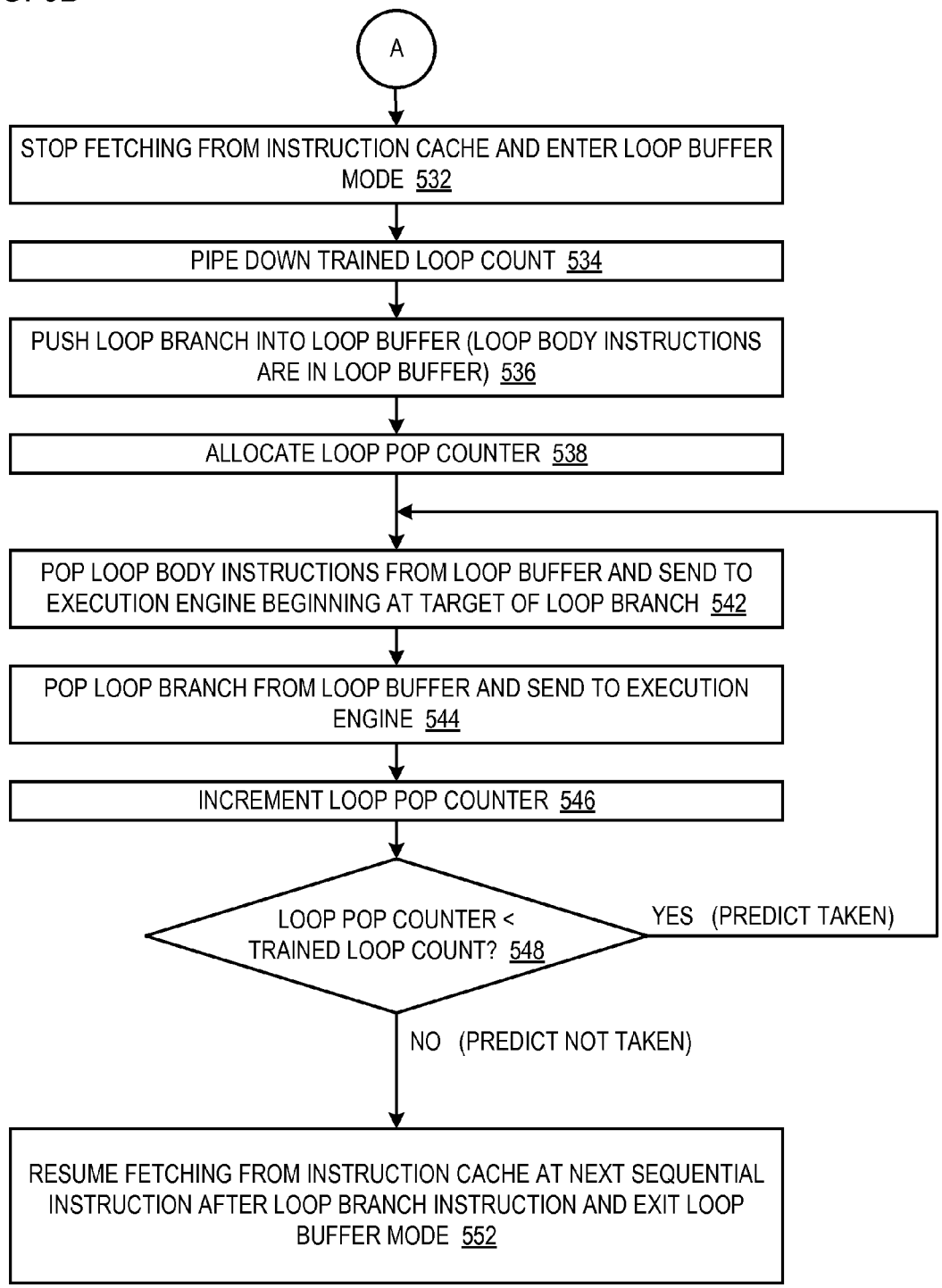

Referring now to FIG. 5, which is composed of FIGS. 5A and 5B, a flowchart further illustrating operation of the processor 100 of FIG. 1 is shown. Flow begins at block 502.

At block 502, the fetch unit 108 fetches a branch instruction from the instruction cache 104. Simultaneously, the BTAC 106 is accessed with the fetch address used to access the instruction cache 104. In response, the BTAC 106 provides the fetch unit 108 with the prediction of the branch instruction and provides the loop predictor 102 with the trained loop branch flag 278 for the fetched branch instruction. Flow proceeds to block 503.

At block 503, the loop predictor 102 obtains the trained loop count 206 from the trained loop count table 201 for the branch instruction, assuming the branch instruction is a loop branch instruction and a trained loop count 206 is available for it. Flow proceeds to decision block 504.

At decision block 504, the loop predictor 102 determines whether the trained loop branch flag 278 is set to indicate the fetched branch instruction is a loop branch that has been trained. If so, flow proceeds to decision block 508; otherwise, flow proceeds to block 506.

At block 506, the fetch unit 108 uses the prediction provided by the BTAC 106 and/or branch history table 116 to predict the branch instruction. Flow ends at block 506.

At decision block 508, the loop predictor 102 determines whether or not a loop fetch counter 234 has already been allocated for the loop branch instruction. If so, flow proceeds to block 514; otherwise, flow proceeds to block 512.

At block 512, the loop predictor 102 allocates a loop fetch counter 234 for the loop branch instruction. Allocating a loop fetch counter includes resetting it to zero. In one embodiment, there is a single loop fetch counter 234, so allocating the loop fetch counter 234 includes simply resetting it. However, in another embodiment, the loop predictor 102 includes a loop fetch counter table that holds a plurality of loop fetch counters, in which case allocating a loop fetch counter 234 includes selecting one of the table entries. Preferably, the different loop fetch counters in the loop fetch counter table are distinguished by their respective loop branch addresses. This may accommodate nested loops whose loop branch instructions may each be accurately predicted by the loop predictor 102. Flow proceeds to block 514.

At block 514, the loop predictor 102 increments the allocated loop fetch counter 234. Flow proceeds to block 518.

At block 518, the loop predictor 102 determines the length, or size, of the loop. Preferably, the instruction buffer 114 control logic maintains the instruction pointer value, or program counter value, for each instruction in the instruction buffer 114. The loop predictor 102 uses the instruction pointer values to find the target instruction of the loop branch instruction and to determine the size of the loop as follows. The loop predictor 102 compares the target address of the loop branch instruction, which is preferably provided by the BTAC 106, with the maintained instruction pointer values to find a match. The newest instruction, in program order, in the instruction buffer 114 with an instruction pointer value that matches the target address is the target instruction of the loop branch instruction. The loop predictor 102 then subtracts (taking into account the circular nature of the instruction buffer 114) the index of the loop branch instruction and the index of the matching target instruction to calculate the length of the loop. Flow proceeds to decision block 522.

At decision block 522, the loop predictor 102 determines whether the loop fits in the instruction buffer 114 based on the length determined at block 518 and the size of the instruction buffer 114. If the size of the loop is not greater than the size of the instruction buffer 114, flow proceeds to block 532; otherwise, flow proceeds to decision block 524.

At decision block 524, the loop predictor 102 determines whether the value of the loop fetch counter 234 incremented at block 514 is less than the value of the trained loop count 206 obtained at block 503. If the value of the loop fetch counter 234 is less than the value of the trained loop count 206, flow proceeds to block 526; otherwise, flow proceeds to block 528.

At block 526, the loop predictor 102 predicts the loop branch instruction is taken, and the fetch unit 108 redirects fetching at the target address provided by the BTAC 106 (or other branch predictor). Flow ends at block 526.

At block 528, the loop predictor 102 predicts the loop branch instruction is not taken, and the fetch unit 108 continues fetching at the next sequential fetch address. Flow ends at block 528.

At block 532, the loop predictor 102 causes the fetch unit 108 to stop fetching from the instruction cache 104 and causes the processor 100 to enter loop buffer mode, which includes providing a value on the mode indicator 274 to indicate such. Preferably, entering loop buffer mode also includes turning off some of the functional units of the front end of the processor 100 pipeline, such as the instruction cache 104, fetch unit 108, decode unit 118, and/or branch history table 116. In one embodiment, turning off a functional unit includes turning off the clocks to the functional unit. In one embodiment, turning off a functional unit also includes turning off power to the functional unit, particularly if the trained loop count 206 is significantly large. In such an embodiment, power is restored to the functional units before the trained loop count 206 has been reached. Flow proceeds to block 534.

At block 534, the trained loop count 206 obtained at block 503 is piped down along with the loop branch instruction so that it can be compared during loop buffer mode with a loop pop counter, as described below. Preferably, the piped down trained loop count 206 is stored in the trained loop count register 242 of FIG. 2. Flow proceeds to block 536.

At block 536, the loop predictor 102 pushes the loop branch instruction into the instruction buffer 114. It is noted that the loop body instructions are already in the instruction buffer 114. Flow proceeds to block 538.

At block 538, the loop predictor 102 allocates a loop pop counter 254 for the loop branch instruction. Allocating a loop pop counter includes resetting it to zero. In one embodiment, there is a single loop pop counter 254, so allocating the loop pop counter 254 includes simply resetting it. However, in another embodiment, the loop predictor 102 includes a loop pop counter table that holds a plurality of loop pop counters, in which case allocating a loop pop counter 254 includes selecting one of the table entries. Preferably, the different loop pop counters in the loop pop counter table are distinguished by their respective loop branch addresses. This may accommodate nested loops that fit within the loop buffer 114 and whose loop branch instructions may each be accurately predicted by the loop predictor 102, as described below with respect to FIG. 7. Flow proceeds to block 542.

At block 542, the processor 100, operating in loop buffer mode, pops instructions of the loop body from the instruction buffer 114 beginning at the target of the loop branch instruction and sends them to the execution engine 112 for execution. Preferably, the length of the loop determined at block 518 is provided to the control logic of the loop buffer 114 so that it knows how many instructions to pop and provide to the execution engine 112 (including the loop branch instruction at block 544 below) and when to increment the loop pop counter 254 (at block 546 below). Flow proceeds to block 544.

At block 544, the processor 100 pops the loop branch instruction from the instruction buffer 114 and sends it to the execution engine 112 for execution and notifies the loop predictor 102. Flow proceeds to block 546.

At block 546, the loop predictor 102 increments the loop pop counter 254 allocated at block 538 because the loop branch instruction has been popped from the instruction buffer 114. Flow proceeds to decision block 548.

At decision block 548, the loop predictor 102 determines whether the value of the loop pop counter 254 is less than the value of the trained loop count 206 piped down at block 534. If so, the loop predictor 102 effectively predicts the loop branch instruction is taken and flow returns to block 542 to begin another iteration of the loop; otherwise, flow proceeds to block 552.

At block 552, the loop predictor 102 effectively predicts the loop branch instruction is not taken and causes the fetch unit 108 to wakeup and resume fetching from the instruction cache 104 at the next sequential instruction after the loop branch instruction. The loop predictor 102 also causes the processor 100 to exit loop buffer mode, which includes providing a value on the mode indicator 274 to indicate such. Flow ends at block 552.

Figure 6:
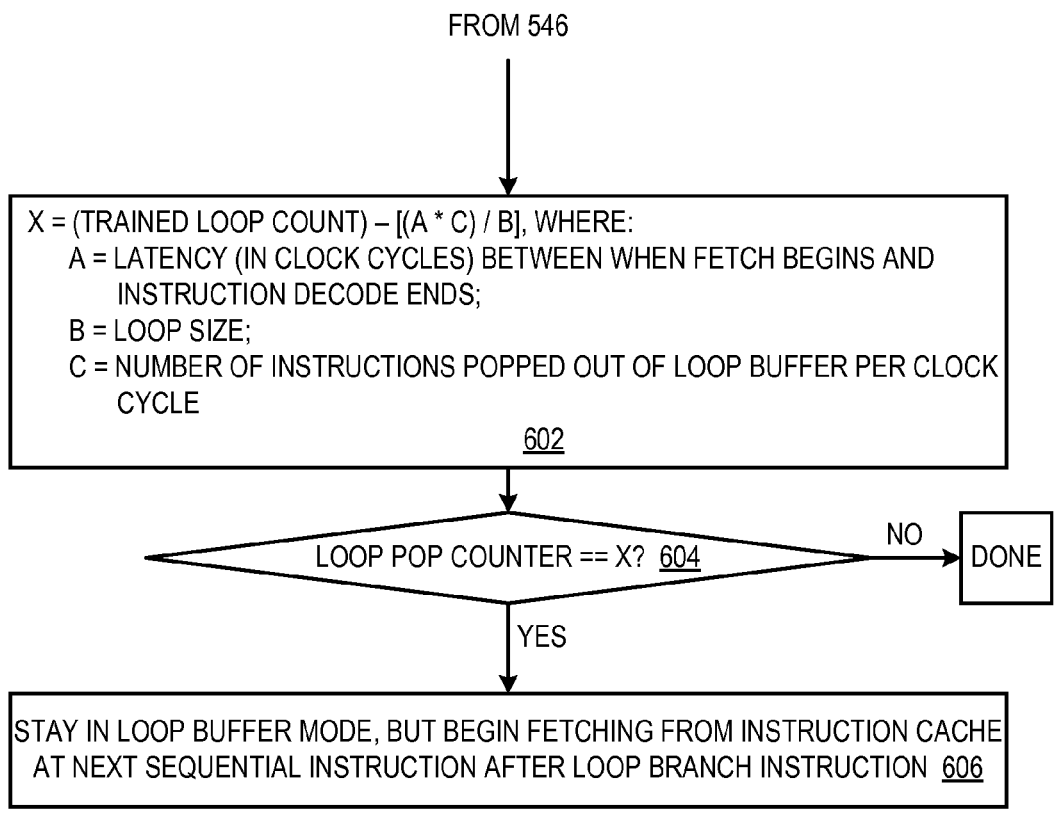
FIG. 6 is a flowchart further illustrating operation of the processor of FIG. 1 according to an alternate embodiment.

Referring now to FIG. 6, a flowchart further illustrating operation of the processor 100 of FIG. 1 according to an alternate embodiment is shown. Flow begins at block 602. Flow proceeds to block 602 from block 546 of FIG. 5 concurrently with the flow from block 546 to decision block 548.

At block 602, the loop predictor 102 computes a value denoted X. The value of X is the value of the trained loop count 206 minus an expression denoted ((A*C)/B), where A, B and C are as follows. The value of A is the number of processor clock cycles required for the processor 100 to fetch a block of instruction bytes from the instruction cache, decode them and provide decoded instructions to the instruction buffer. Preferably, this value is predetermined based on the design of the processor 100. The value of B is the number of instructions in the loop, which was determined at block 518. The value of C is the number of instructions that the processor 100 is capable of providing from the instruction buffer 114 to the execution engine 112 per clock cycle. Flow proceeds to decision block 604.

At decision block 604, the loop predictor 102 determines whether the loop pop counter 254 equals the value X computed at block 602. If so, flow proceeds to block 606; otherwise, flow ends.

At block 606, the loop predictor 102 causes the processor 100 to stay in the loop buffer mode, but causes the fetch unit 108 to wake up and begin fetching instructions from the instruction cache 104 at the next sequential instruction after the loop branch instruction. Advantageously, this may substantially serve to avoid introducing bubbles into the pipeline of the processor 100 and thereby improve the utilization of the execution engine 112 over an embodiment that waits to begin fetching until the last iteration of the loop execution instance. Flow ends at block 606.

Figure 7:
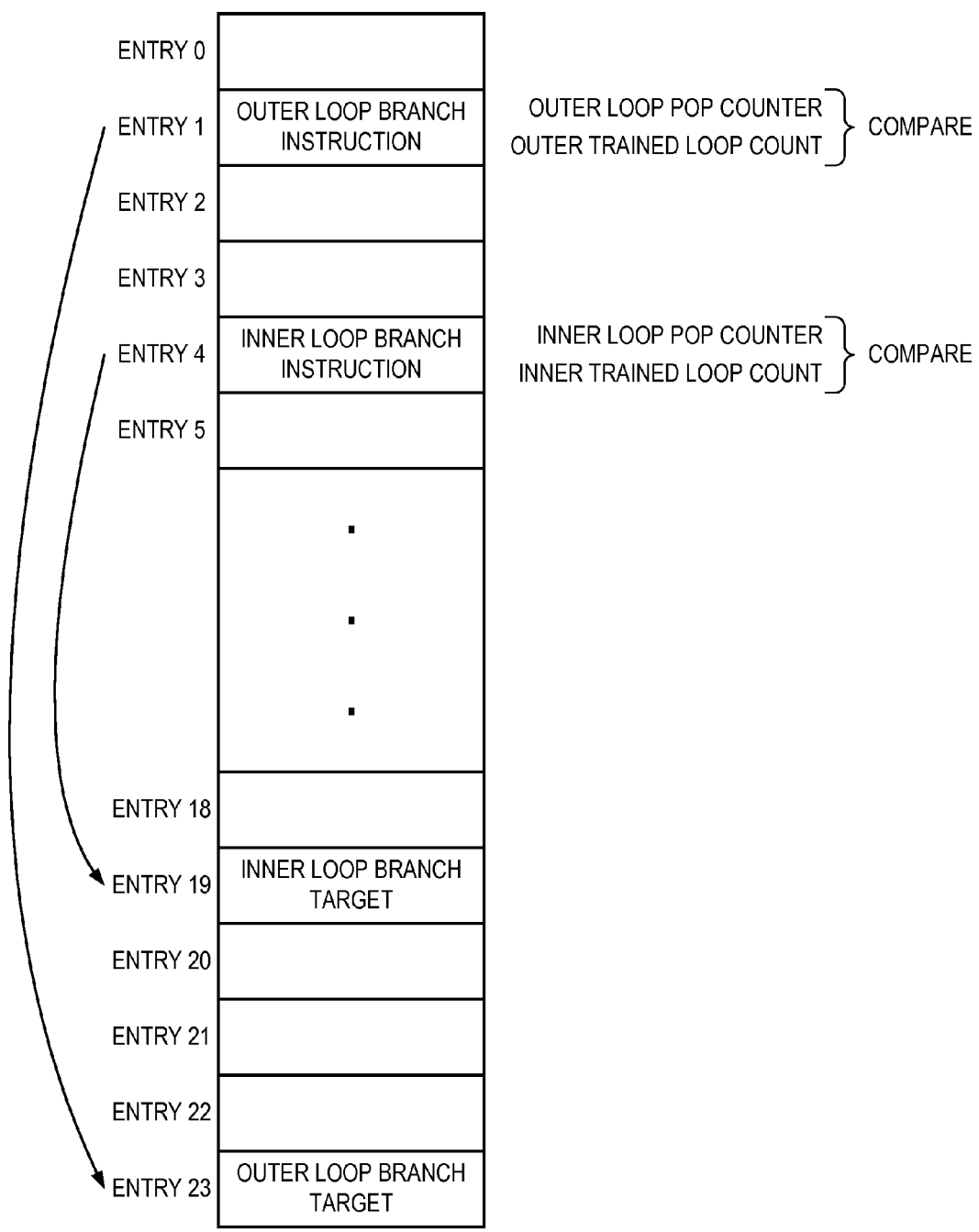
FIG. 7 is a block diagram illustrating, by way of example, the instruction buffer of FIG. 1 operating in loop buffer mode to provide instructions of nested loops to the execution engine of FIG. 1.

Referring now to FIG. 7, a block diagram illustrating, by way of example, the instruction buffer 114 of FIG. 1 operating in loop buffer mode to provide instructions of nested loops to the execution engine 112 of FIG. 1 is shown. In the example of FIG. 7, the instruction buffer 114 includes 24 entries denoted entries 0 through 23. Entry 0 is at the top and entry 23 is at the bottom of the instruction buffer 114. Instructions are pushed into the top of the instruction buffer 114 and are popped from the bottom of the instruction buffer 114. FIG. 7 depicts an inner loop nested inside an outer loop. When the processor 100 enters loop buffer mode, the inner loop branch instruction is located in entry 4, the inner loop branch target instruction is located in entry 19, the outer loop branch instruction is located in entry 1, and the outer loop branch target instruction is located in entry 23. Thus, in the example, all the instructions of both the inner and outer loops fit within the loop buffer 114.

In the example of FIG. 7, it is assumed that the inner and outer loop branch instructions have been trained per FIG. 3 and not invalidated per FIG. 4. According to the operation of the processor 100 described above, the first time the inner loop branch instruction (after having been trained) is fetched from the instruction cache 104 at block 502, or shortly thereafter, the loop body instructions of the outer loop up to, but not including, the inner loop branch instruction have been decoded and pushed into entries 23 through 5, respectively, of the loop buffer 114, which includes the instructions of the body of the inner loop (into entries 19 through 5) and the inner trained loop count 206 is obtained from the trained loop count table 201 per block 503. Subsequently, the processor 100 enters loop buffer mode per block 532, the inner trained loop count 206 is captured in the trained loop count register 242 per block 534, the inner loop branch instruction is pushed into entry 4 per block 536, the inner loop pop counter 254 is allocated per block 538, and the processor 100 begins to send the instructions of the inner loop to the execution engine 112 from the loop buffer 114 for the first execution instance of the inner loop in loop buffer mode.

Eventually, the loop predictor 102 predicts the exit of the first execution instance of the inner loop per block 548, and the processor 100 exits loop buffer mode per block 552 and begins to fetch the remaining instructions of the outer loop, which are decoded and pushed into the loop buffer 114. When the outer loop branch instruction is fetched from the instruction cache 104 at block 502, the outer trained loop count 206 is obtained from the trained loop count table 201 per block 503. Subsequently, the processor 100 enters loop buffer mode per block 532, the outer trained loop count 206 is captured in another allocated trained loop count register 242 per block 534, the outer loop branch instruction is pushed into entry 1 per block 536, the outer loop pop counter 254 is allocated per block 538, and the processor 100 begins to send the instructions of the outer loop to the execution engine 112 from the loop buffer 114 for a second iteration of the outer loop, which is performed in loop buffer mode, and which will include another execution instance of the inner loop in loop buffer mode. Preferably, a mechanism is included for detecting the nested loop situation. For example, a nesting level counter may be included that is initialized to zero and that counts up each time another level of loop buffer-contained nesting is entered at block 532 and that counts down each time a loop buffer-contained level of nesting is exited at block 552. The processor 100 exits loop buffer mode at block 552 only when the nesting level counter has a value of zero. Additionally, at block 552, the loop predictor 102 resets the loop pop counter 254 allocated for the loop whose execution instance is exiting to zero.

Eventually, the loop predictor 102 predicts the exit of the execution instance of the outer loop per block 548, and the processor 100 exits loop buffer mode per block 552. However, as may be seen, more loops may be nested and predicted by the loop predictor 102 in loop buffer mode up to the number of loop pop counters 254, trained loop counts 206, and trained loop counter registers 242 that are available for allocation, as long as the nested loops all fit into the loop buffer 114.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor, comprising:
   an instruction cache;
   an execution engine;
   an instruction buffer to buffer loop instructions decoded by a decode unit; and
   a loop predictor that:
      trains a branch instruction to determine a trained loop count of a loop, wherein the loop comprises a sequence of instructions beginning with a target of the branch instruction and ending with the branch instruction; and
      determines whether a size of the loop is not greater than a size of the instruction buffer; and
   wherein, when the size of the loop is not greater than the size of the instruction buffer, the processor:
      stops fetching from the instruction cache;
      sends the loop instructions to the execution engine from the instruction buffer without fetching them from the instruction cache;

maintains a loop pop count that indicates a number of times the branch instruction is sent to the execution engine from the instruction buffer without being fetched from the instruction cache; and
predicts the branch instruction is taken when the loop pop count is less than the trained loop count and otherwise predicts the branch instruction is not taken.

2. The processor of claim 1, further comprising:
wherein, when the size of the loop is greater than the size of the instruction buffer, the processor:
fetches the loop instructions from the instruction cache, decodes them and sends them to the execution engine;
maintains a loop fetch count that indicates a number of times the branch instruction is fetched from the instruction cache; and
predicts the branch instruction is taken when the loop fetch count is less than the trained loop count and otherwise predicts the branch instruction is not taken.

3. The processor of claim 2, further comprising:
a loop fetch table that holds a respective loop fetch count for each of a plurality of trained branch instructions.

4. The processor of claim 1, wherein the loop predictor further comprises a trained loop count register that stores a piped-down version of the trained loop count, which is to be compared with the loop pop count.

5. The processor of claim 1, wherein when the loop pop count reaches a threshold value, the processor resumes fetching instructions from the instruction cache at a next sequential instruction after the branch instruction;
wherein the threshold value is the trained loop count minus ((A*C)/B);
wherein A is a predetermined number of clock cycles of the processor required for the processor to fetch instructions from the instruction cache, decode them and provide them to the instruction buffer;
wherein B is a number of the loop instructions; and
wherein C is a number of instructions that the processor is capable of sending to the execution engine from the instruction buffer per clock cycle.

6. The processor of claim 1, wherein the instruction buffer holds instructions that have been fetched from the instruction cache and then decoded but not yet sent to the execution engine.

7. The processor of claim 1, further comprising:
a loop pop table that holds a respective loop pop count for each of a plurality of trained branch instructions.

8. The processor of claim 1, further comprising:
a trained loop count table that holds a respective trained loop count for each of a plurality of trained branch instructions.

9. The processor of claim 1, further comprising:
a branch cache, comprising a plurality of entries, wherein an entry of the plurality of entries holds:
a prediction of the branch instruction based on a history of previous executions of the branch instruction; and
a flag that indicates whether the branch instruction is a trained branch instruction having the trained loop count; and
wherein the processor uses the trained loop count to predict the branch instruction when the flag indicates the branch instruction is a trained branch instruction and otherwise uses the prediction of the branch cache.

10. A method performed by a processor having an instruction cache, an instruction buffer, and an execution engine, the method comprising:
training a branch instruction to determine a trained loop count of a loop, wherein the loop comprises a sequence of instructions beginning with a target of the branch instruction and ending with the branch instruction;
determining whether a size of the loop is not greater than a size of the instruction buffer; and
when the size of the loop is not greater than the size of the instruction buffer:
stopping fetching from the instruction cache;
sending the loop instructions to the execution engine from the instruction buffer without fetching them from the instruction cache, wherein the loop instructions buffered in the instruction buffer are decoded by a decode unit;
maintaining a loop pop count that indicates a number of times the branch instruction is sent to the execution engine from the instruction buffer without being fetched from the instruction cache; and
predicting the branch instruction is taken when the loop pop count is less than the trained loop count and otherwise predicting the branch instruction is not taken.

11. The method of claim 10, further comprising:
when the size of the loop is greater than the size of the instruction buffer:
fetching the loop instructions from the instruction cache, decoding them and sending them to the execution engine;
maintaining a loop fetch count that indicates a number of times the branch instruction is fetched from the instruction cache; and
predicting the branch instruction is taken when the loop fetch count is less than the trained loop count and otherwise predicting the branch instruction is not taken.

12. The method of claim 11, further comprising:
allocating an entry in a loop fetch table to hold the loop fetch count, wherein the loop fetch table holds a respective loop fetch count for each of a plurality of trained branch instructions.

13. The method of claim 10, wherein when the size of the loop is not greater than the size of the instruction buffer, the method further comprising:
piping down the trained loop count, and comparing the piped down trained loop count with the loop pop count.

14. The method of claim 10, further comprising:
when the loop pop count reaches a threshold value, resuming fetching instructions from the instruction cache at a next sequential instruction after the branch instruction;
wherein the threshold value is the trained loop count minus ((A*C)/B);
wherein A is a predetermined number of clock cycles of the processor required for the processor to fetch instructions from the instruction cache, decode them and provide them to the instruction buffer;
wherein B is a number of the loop instructions; and
wherein C is a number of instructions that the processor is capable of sending to the execution engine from the instruction buffer per clock cycle.

15. The method of claim 10, further comprising:
holding in the instruction buffer instructions that have been fetched from the instruction cache and then decoded but not yet sent to the execution engine.

16. The method of claim 10, further comprising:
allocating an entry in a loop pop table to hold the loop pop count, wherein the loop pop table holds a respective loop pop count for each of a plurality of trained branch instructions.

17. The method of claim 10, further comprising:
allocating an entry in a trained loop count table to hold the trained loop count, wherein the trained loop pop table holds a respective trained loop count for each of a plurality of trained branch instructions.

18. The method of claim 10,
wherein the processor also includes a branch cache, comprising a plurality of entries, wherein an entry of the plurality of entries holds a prediction of the branch instruction based on a history of previous executions of the branch instruction and a flag that indicates whether the branch instruction is a trained branch instruction having the trained loop count;
wherein the method further comprises:
using the trained loop count to predict the branch instruction when the flag indicates the branch instruction is a trained branch instruction and otherwise using the prediction of the branch cache.

19. A computer program product encoded in at least one non-transitory computer usable medium for use with a computing device, the computer program product comprising:
computer usable program code embodied in said medium, for specifying a processor, the computer usable program code comprising:
first program code for specifying an instruction cache;
second program code for specifying an execution engine;
third program code for specifying an instruction buffer to buffer loop instructions decoded by a decode unit; and
fourth program code for specifying a loop predictor;
wherein the loop predictor:
trains a branch instruction to determine a trained loop count of a loop, wherein the loop comprises a sequence of instructions beginning with a target of the branch instruction and ending with the branch instruction; and
determines whether a size of the loop is not greater than a size of the instruction buffer; and
wherein, when the size of the loop is not greater than the size of the instruction buffer, the processor:
stops fetching from the instruction cache;
sends the loop instructions to the execution engine from the instruction buffer without fetching them from the instruction cache;
maintains a loop pop count that indicates a number of times the branch instruction is sent to the execution engine from the instruction buffer without being fetched from the instruction cache; and
predicts the branch instruction is taken when the loop pop count is less than the trained loop count and otherwise predicts the branch instruction is not taken.

20. The computer program product of claim 19, wherein the at least one non-transitory computer usable medium is selected from the set of a disk, tape, or other magnetic, optical, or electronic storage medium.

* * * * *